United States Patent
Harriat

(10) Patent No.: US 10,788,201 B2
(45) Date of Patent: Sep. 29, 2020

(54) SOLAR POWERED BOILER ASSEMBLY

(71) Applicant: Samuel Harriat, Bloomfield, CT (US)

(72) Inventor: Samuel Harriat, Bloomfield, CT (US)

( * ) Notice: Subject to any disclaimer, the term of this patent is extended or adjusted under 35 U.S.C. 154(b) by 97 days.

(21) Appl. No.: 16/150,358

(22) Filed: Oct. 3, 2018

(65) Prior Publication Data
US 2020/0109852 A1 Apr. 9, 2020

(51) Int. Cl.
F22B 1/00 (2006.01)
F24S 23/70 (2018.01)
F24S 20/20 (2018.01)
F03G 6/06 (2006.01)

(52) U.S. Cl.
CPC ............ F22B 1/006 (2013.01); F03G 6/06 (2013.01); F24S 20/20 (2018.05); F24S 23/70 (2018.05)

(58) Field of Classification Search
CPC .... F24J 2/08; F24S 80/30; F24S 23/30; F24S 80/54; F24S 23/31; F24S 10/30
See application file for complete search history.

(56) References Cited

U.S. PATENT DOCUMENTS

| 4,188,941 | A | * | 2/1980 | Hopkins | F24S 70/65 126/646 |
| 4,203,806 | A | * | 5/1980 | Diggs | B01D 3/00 202/176 |
| 4,459,970 | A | * | 7/1984 | Clee | F24S 23/30 126/563 |
| 4,717,727 | A | * | 1/1988 | Gunzler | A61P 37/06 514/354 |
| 5,699,785 | A | * | 12/1997 | Sparkman | F24S 60/30 126/623 |
| 8,739,774 | B2 | | 6/2014 | O'Donnell | |
| 8,877,016 | B2 | | 11/2014 | Ba-abbad | |
| 9,140,467 | B2 | | 9/2015 | Sadeh | |
| 9,546,640 | B2 | | 1/2017 | Newman | |
| 2008/0156316 | A1 | * | 7/2008 | Yangpichit | F03G 6/045 126/698 |
| 2008/0236569 | A1 | * | 10/2008 | Tuccio | H01L 31/0543 126/600 |
| 2009/0159078 | A1 | * | 6/2009 | Penciu | F03G 6/00 126/704 |
| 2010/0148521 | A1 | * | 6/2010 | Johnston | F03D 9/14 290/1 R |
| 2010/0244449 | A1 | * | 9/2010 | Lee | F01K 3/16 290/52 |
| 2011/0079267 | A1 | * | 4/2011 | Raymond | F24S 23/30 136/246 |
| 2013/0276775 | A1 | * | 10/2013 | Stettenheim | F03G 6/06 126/652 |
| 2016/0208656 | A1 | | 7/2016 | Bruckner | |
| 2017/0030264 | A1 | | 2/2017 | Chen | |

* cited by examiner

Primary Examiner — Shafiq Mian

(57) ABSTRACT

A solar powered boiler assembly for producing steam with solar energy includes a bowl that is positioned in the ground. A boiler is positioned in the bowl and the boiler has a fluid therein. A dome is removably positioned on the bowl. A plurality of lenses each extends through the dome such that each of the lenses is exposed to sunlight. Each of the lenses focuses the sunlight onto the boiler to heat the boiler. In this way the boiler produces steam by heating the fluid therein. A reflector is coupled to the dome and the reflector is comprised of a light reflecting material for reflecting sunlight onto the lenses.

13 Claims, 5 Drawing Sheets

ED STATES PATENT
SOLAR POWERED BOILER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to boiler devices and more particularly pertains to a new boiler device for producing steam with solar energy.

BRIEF SUMMARY OF THE INVENTION

An embodiment of the disclosure meets the needs presented above by generally comprising a bowl that is positioned in the ground. A boiler is positioned in the bowl and the boiler has a fluid therein. A dome is removably positioned on the bowl. A plurality of lenses each extends through the dome such that each of the lenses is exposed to sunlight. Each of the lenses focuses the sunlight onto the boiler to heat the boiler. In this way the boiler produces steam by heating the fluid therein. A reflector is coupled to the dome and the reflector is comprised of a light reflecting material for reflecting sunlight onto the lenses.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
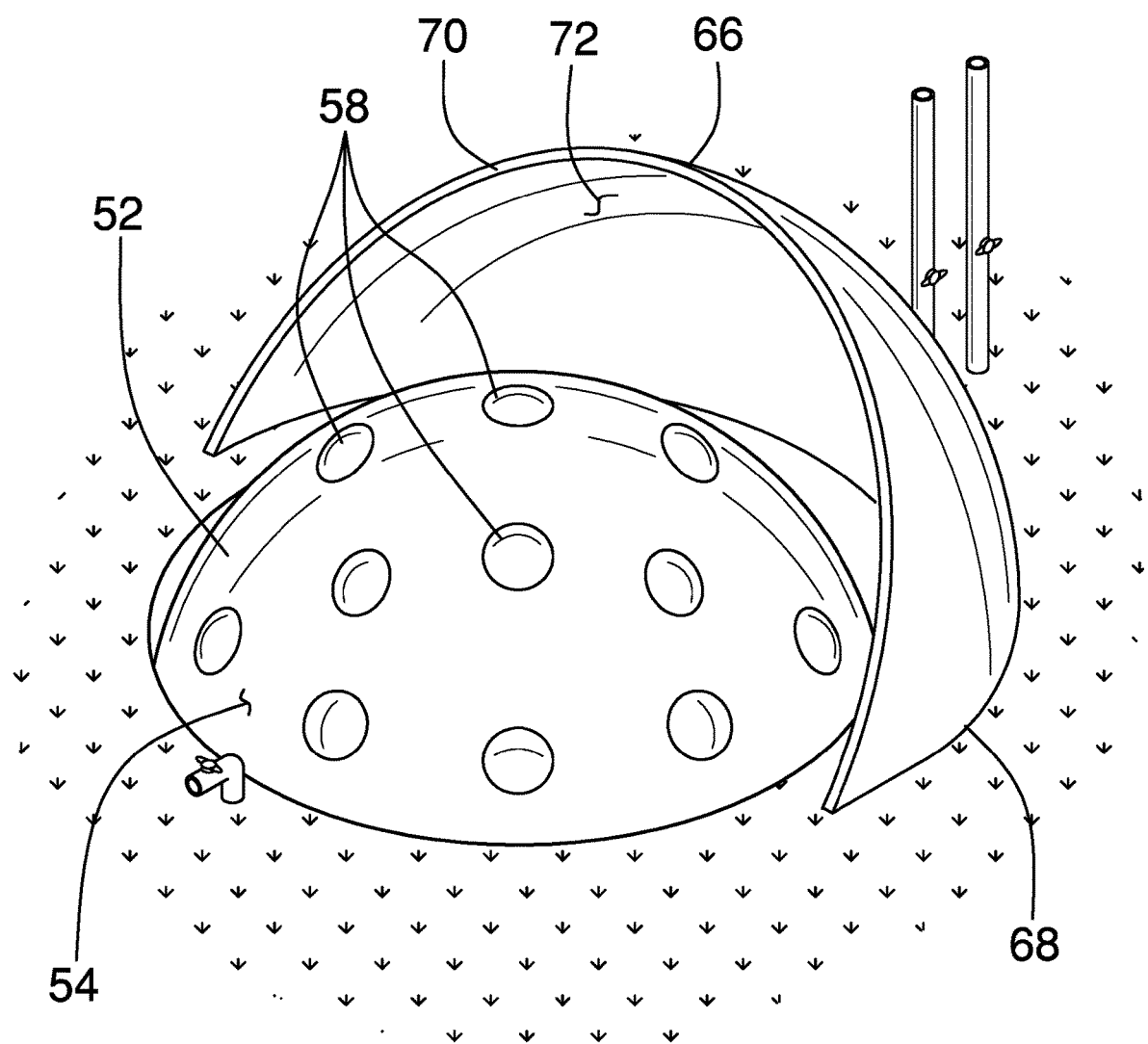
FIG. 1 is a top perspective view of a solar powered boiler assembly according to an embodiment of the disclosure.
Figure 2:
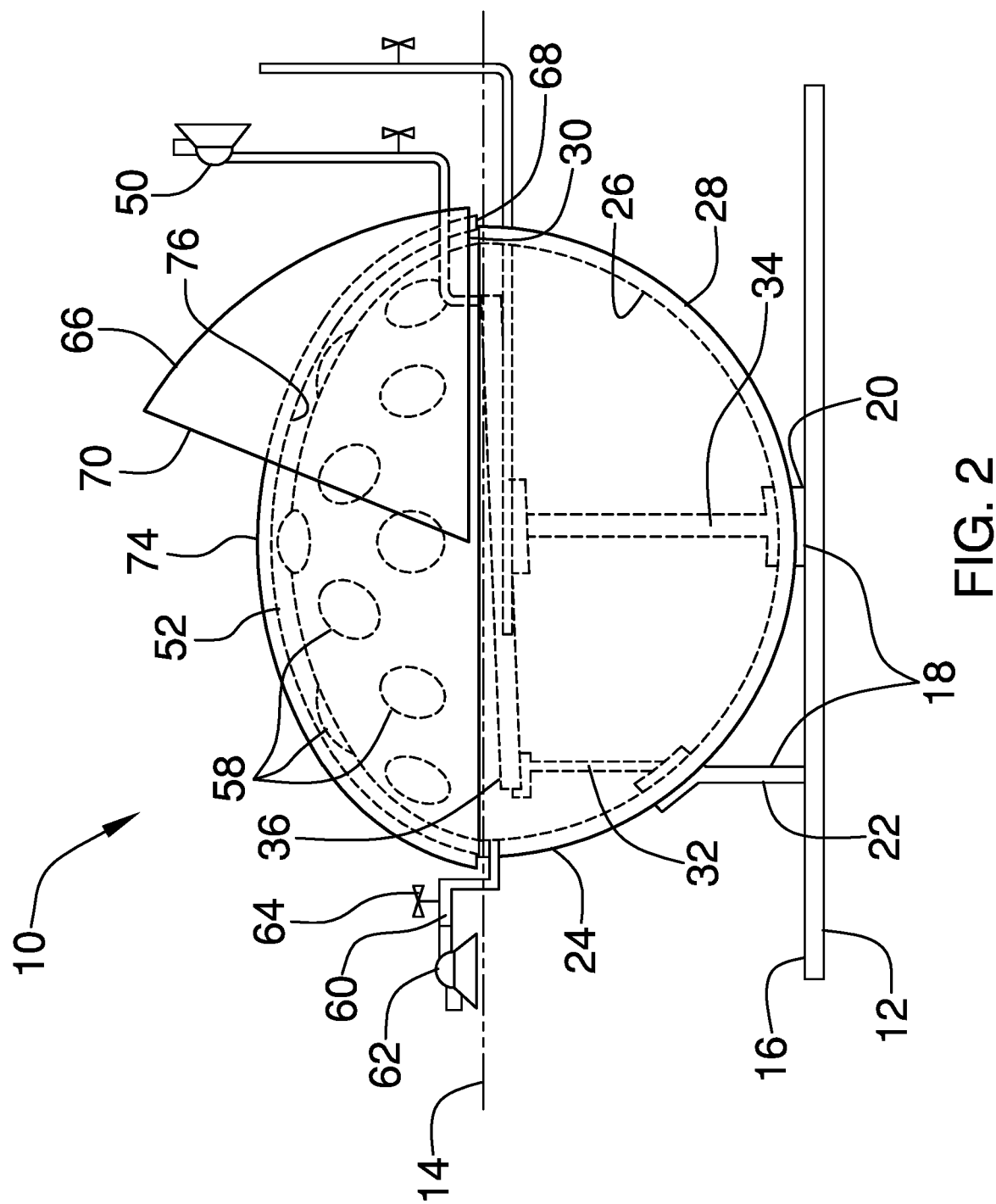
FIG. 2 is a side view of an embodiment of the disclosure.
Figure 3:
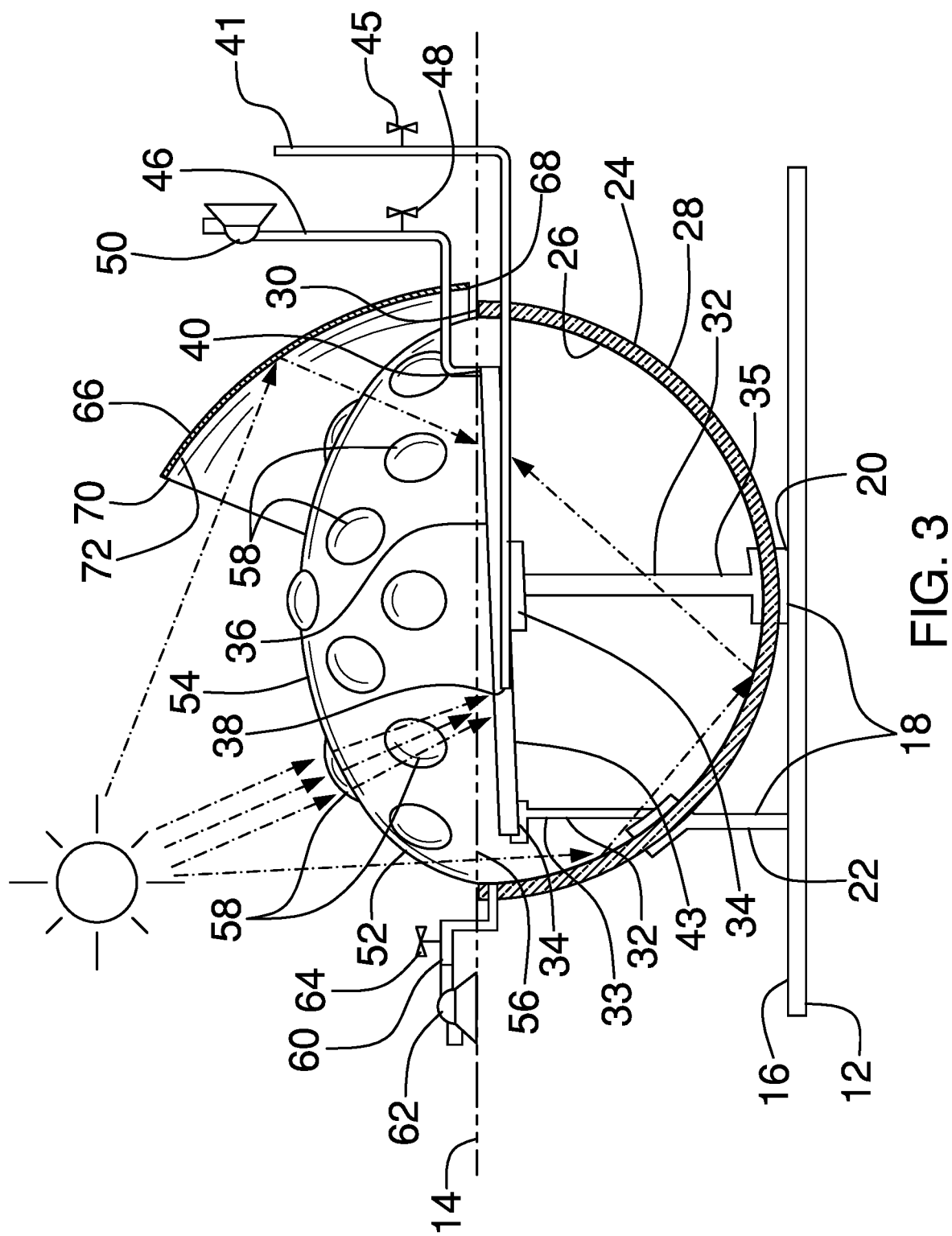
FIG. 3 is a partial cut-away side view of an embodiment of the disclosure.
Figure 4:
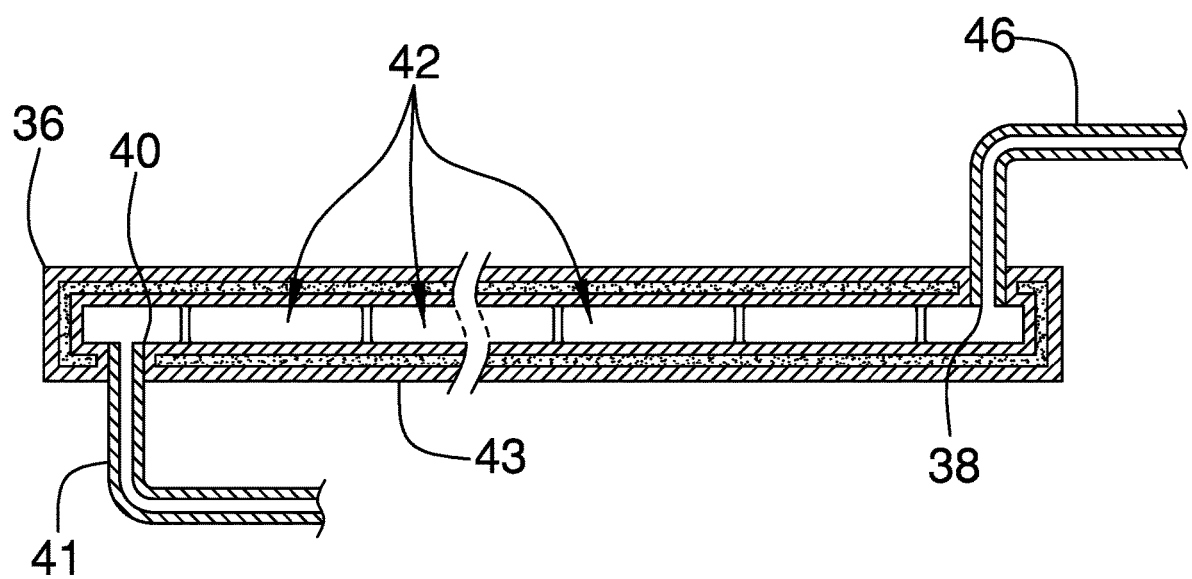
FIG. 4 is a cross sectional partial view taken along a central front to back axis line of an embodiment of the disclosure.

With reference now to the drawings, and in particular to FIGS. 1 through 5 thereof, a new boiler device embodying the principles and concepts of an embodiment of the disclosure and generally designated by the reference numeral 10 will be described.

As best illustrated in FIGS. 1 through 4, the solar powered boiler assembly 10 generally comprises a pad 12 that is positioned below ground 14 and is horizontally oriented. The pad 12 has an upper surface 16 and the pad 12 is comprised of a rigid material such as concrete or the like. A plurality of supports 18 is included and each of the supports 18 is coupled to and extends upwardly from the upper surface 16 of the pad 12. A first one 20 of the supports 18 is centrally positioned on the pad 12 and a second one 22 of the supports 18 is positioned between the first support 20 and an outer edge of the pad 12. Additionally, the second support 22 has a height that is greater than a height of the first support 20.

A bowl 24 is provided and the bowl 24 is positioned in the ground 14. The bowl 24 has an inside surface 26, an outside surface 28 and a perimeter edge 30 extending therebetween. The outside surface 28 rests on each of the supports 18 having the perimeter edge 30 being aligned with the ground 14. The inside surface 26 is comprised of a light reflecting material and the inside surface 26 is concavely arcuate with respect to the perimeter edge 30. Thus, the inside surface 26 directs reflected light toward a focal point with respect to the bowl 24. The bowl 24 is comprised of a thermally insulating material to inhibit thermal communication between an interior of the bowl 24 and ambient air.

A plurality stands 32 is provided and each of the stands 32 is coupled to and extends upwardly from the inside surface 26 of the bowl 24 and each of the stands 32 is vertically oriented. Each of the stands 32 has a distal end 34 with respect to the inside surface 26. A first one 33 of the stands 32 is aligned with the first support 20 and a second one 35 of the stands 32 is aligned with the second support 22. Moreover, the distal end 34 of each of the stands 32 is spaced downwardly from the perimeter edge 30 of the bowl 24.

A boiler 36 is provided and the boiler 36 is positioned in the bowl 24. The boiler 36 has an inlet 38, an outlet 40 and a plurality of chambers 42 within the boiler 36 that are each fluidly connected between the inlet 38 and the outlet 40. Moreover, the boiler 36 is comprised of a thermally conductive material such as steel or the like. The boiler 36 is positioned on the distal end 34 of each of the stands 32 such that the boiler 36 is horizontally oriented in the bowl 24. An outer surface 43 of the boiler 36 black colored with a very low gloss, thereby facilitating the outer surface 43 of the boiler 36 to absorb the maximum amount of solar energy.

The first stands 32 transfers the weight of the boiler 36 into the first support 20 and the second stand transfers the weight of the boiler 36 into the second support 22. In this way the bowl 24 is inhibited from supporting the weight of the boiler 36 and potentially breaking, cracking or otherwise structurally failing as a result of the weight of the boiler 36. The boiler 36 is aligned with the focal point with respect to the bowl 24 such that the inside surface 26 of the bowl 24 directs the reflected light onto the boiler 36. Additionally, the boiler 36 is oriented at an angle such that the inlet 38 is positioned lower than the outlet 40.

A fluid conduit 41 is fluidly coupled to the inlet 38 of the boiler 36 and the fluid conduit 41 is in fluid communication with a fluid source 44 to direct a fluid into the boiler 36. The fluid source 44 may be a water line or the like and the fluid may be water or other steam producing fluid. A fluid valve 45 is provided and the fluid valve 45 is coupled to the fluid conduit 41. The fluid valve 45 is positionable in a closed position to inhibit the fluid from passing through the fluid conduit 41, and the fluid valve 45 is positionable in an open position to facilitate the fluid to pass through the fluid conduit 41. The fluid valve 45 may be a ball valve or any other type of manually manipulated fluid valve 45.

An evacuation conduit 46 is fluidly coupled to the outlet 40 of the boiler 36 and an evacuation valve 48 is fluidly coupled to the evacuation conduit 46. The evacuation valve 48 is positionable in a closed position to inhibit air from passing through the evacuation conduit 46, and the evacuation valve 48 is positionable in an open position to facilitate air to pass through the evacuation conduit 46. The evacuation valve 48 may be any manually operated valve that forms a fluid impermeable seal with the valve is closed. Additionally, the evacuation valve 48 may be capable of withstanding a vacuum pressure of at least 0.03 ATM. Each of the fluid conduit 41 and the evacuation conduit 46 are comprised of a thermally insulating material.

An evacuation pump 50 is provided and the evacuation pump 50 is fluidly coupled to the evacuation conduit 46. The evacuation pump 50 urges air outwardly from the boiler 36 when the evacuation pump 50 is turned on. In this way air in the boiler 36 is removed to increase thermal communication between the fluid and the boiler 36. The evacuation pump 50 may be an electric air pump 62 or the like that is capable of lowering the air pressure within the boiler 36 to at least 0.03 ATM.

A dome 52 is provided and the dome 52 is removably positioned on the bowl 24. The dome 52 has an outer surface 54 and an outer edge 56, and the outer edge 56 engages the perimeter edge 30 of the bowl 24. Thus, the dome 52 extends upwardly from the bowl 24 such that the dome 52 and the bowl 24 form an enclosure. The outer edge 56 forms a fluid impermeable seal with the perimeter edge 30 of the bowl 24. The dome 52 may include a gasket or other compressible member that is positioned on the outer edge 56 of the dome 52 or other means of forming a fluid impermeable seal with the bowl 24. The dome 52 is comprised of a translucent material such as glass or the like.

A plurality of lenses 58 is provided and each of the lenses 58 extends through the dome 52 such that each of the lenses 58 is exposed to sunlight. Each of the lenses 58 focuses the sunlight onto the boiler 36 to heat the boiler 36. In that way the boiler 36 produces steam by heating the fluid in the boiler 36. The lenses 58 are spaced apart from each other and are distributed around an entire curvature of the dome 52. In this way the lenses 58 continually focus sunlight onto the boiler 36 as the sun travels along its ecliptic. Each of the lenses 58 may be convex burning lenses or the like that focuses sunlight to produce a temperature of at least 575 degrees Fahrenheit.

An air conduit 60 is coupled to the bowl 24 and the air conduit 60 extends through the outside surface 28 and the inside surface 26 of the bowl 24. An air pump 62 is fluidly coupled to the air conduit 60 and the air pump 62 urges air outwardly from the bowl 24 when the air pump 62 is turned on. The air pump 62 may be an electric air pump or the like that is capable of lowering air pressure in the bowl 24 to at least 0.03 ATM. An air valve 64 is fluidly coupled to the air conduit 60. The air valve 64 is positionable in an open position to facilitate air to flow through the air conduit 60, and the air valve 64 is positionable in a closed position to inhibit air from flowing through the air conduit 60. The air valve 64 may be a manually operated air valve 64 that forms a fluid impermeable seal when the air valve 64 is closed. Additionally, the air valve 64 may be capable of withstanding a vacuum pressure of at least 0.03 ATM.

A reflector 66 is provided and the reflector 66 is coupled to the dome 52. The reflector 66 is comprised of a light reflecting material for reflecting sunlight onto the lenses 58. The reflector 66 has a first edge 68, a second edge 70 and a first surface 72 extending therebetween. The first surface 72 is concavely arcuate between the first 68 and second 70 edges. The first edge 68 rests on the ground and the first surface 72 is spaced from and is co-arcuate with the outer surface of the dome 52. Additionally, the reflector 66 is oriented on the dome 52 such that the second edge 70 of the reflector 66 is directed toward the ecliptic. In this way the first surface 72 is continuously exposed to sunlight as the sun travels along the ecliptic.

Figure 5:
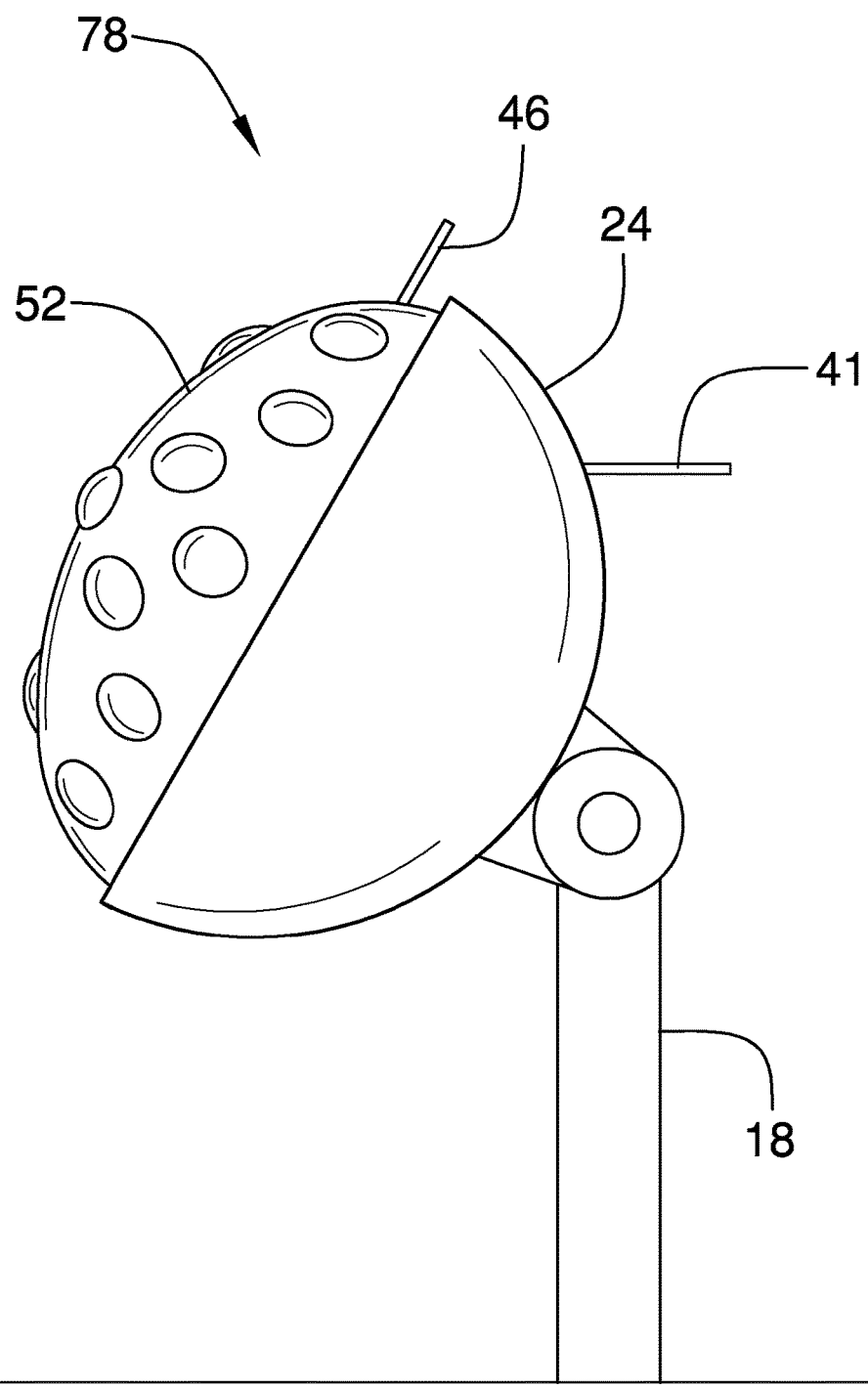
FIG. 5 is a side view of an alternative embodiment of the disclosure.

A cover 74 is provided and the cover 74 is selectively positioned to cover 74 the dome 52. The cover 74 is comprised of an opaque material such that the cover 74 inhibits sunlight from striking the lenses 58. In this way the cover 74 inhibits the boiler 36 from being heated. The cover 74 may be a blanket or other deformable object that is additionally light impermeable. Further, the cover 74 has a first surface 76 that is comprised of a reflective material and the first surface 72 lies on the dome 52 when the cover 74 is positioned on the dome 52. Thus, the first surface 72 of the cover 74 reflects heat energy back into the bowl 24. In an alternative embodiment 78 as shown in FIG. 5, each of the supports 18 is positioned above ground thusly placing the bowl 24, the dome 52 and above ground as well. The bowl 24 may be pivotally coupled to the supports 18 for positioning the bowl 24 at a selected angle with respect to the sun. Additionally, the supports 18 may be rotatable thereby facilitating the bowl 24 to follow the sun along the ecliptic.

In use, each of the air valve 64 and the evacuation valve 48 is opened and each of the air pump 62 and the evacuation pump 50 are turned to on purge air from the bowl 24 and the boiler 36. Each of the air valve 64 and the evacuation valve 48 is closed the each of the air pump 62 and the evacuation pump 50 are turned off when the air pressure within the enclosure formed by the dome 52 and the bowl 24, and the air pressure within the boiler 36, falls below 0.03 ATM. The lenses 58 focus sunlight into the bowl 24 and onto the boiler 36. Additionally, the inside surface 26 of the bowl 24 reflects sunlight upwardly on the boiler 36 to heat the boiler 36. In this way the boiler 36 is heated to a temperature of at least 575 degrees Fahrenheit.

The fluid valve 45 is opened and the fluid pump is turned on to urge the fluid into the boiler 36 when the boiler 36 has been heated for producing steam. The evacuation valve 48 is opened to release the steam from the boiler 36 for use in powering a steam turbine or other steam driven mechanism for producing electrical energy. In this way solar energy is harnessed for producing electrical energy in a manner that minimizes impact on the environment as compared to traditional solar fields. The cover 74 is placed on the dome 52 to lower the internal temperature of the bowl 24 and the boiler 36 when the internal temperature reaches dangerously high levels, or to retain heat within the bowl 24 and the boiler 36 when the sun sets.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A solar powered boiler assembly being configured to produce steam from solar energy, said assembly comprising:
    a bowl being positioned in the ground, said bowl having an inside surface, an outside surface and a perimeter edge extending therebetween;
    a boiler being positioned in said bowl, said boiler having a fluid therein;
    a dome being removably positioned on said bowl;
    a plurality of lenses, each of said lenses extending through said dome such that each of said lenses is exposed to sunlight, each of said lenses focusing the sunlight onto said boiler to heat said boiler wherein said boiler is configured to produce steam by heating the fluid therein;
    a reflector being coupled to said dome, said reflector being comprised of a light reflecting material for reflecting sunlight onto said lenses;
    a pad being positioned below ground and being horizontally oriented, said pad having an upper surface, said pad being comprised of a rigid material;
    a plurality of supports, each of said supports being coupled to and extending upwardly from said upper surface of said pad, said outside surface of said bowl resting on each of said supports having said perimeter edge being aligned with a surface of the ground; and
    wherein said dome has an outer surface and an outer edge, said outer edge engaging said perimeter edge of said bowl having said dome extending upwardly from said bowl such that said dome and said bowl forms an enclosure, said outer edge forming a fluid impermeable seal with said perimeter edge of said bowl.

2. The assembly according to claim 1, wherein:
    said inside surface of said bowl is comprised of a light reflecting material; and
    said inside surface of said bowl is concavely arcuate with respect to said
        perimeter edge such that said inside surface directs reflected light toward a focal point with respect to said bowl.

3. The assembly according to claim 1 wherein said lenses are spaced apart from each other and are distributed around an entire curvature of said dome wherein said lenses are configured to continually focus sunlight onto said boiler as the sun travels along its ecliptic.

4. The assembly according to claim 1, wherein said reflector has a first edge, a second edge and a first surface extending therebetween, said first surface being concavely arcuate between said first and second edges, said first edge lying on the ground, said first surface being spaced from and being co-arcuate with said outer surface of said dome.

5. The assembly according to claim 1, further comprising a cover being selectively positioned to cover said dome, said cover being comprised of an opaque material such that said cover inhibits sunlight from striking said lenses thereby inhibiting said boiler from being heated.

6. The assembly according to claim 2, further comprising a plurality stands, each of said stands being coupled to and extending upwardly from said inside surface of said bowl having each of said stands being vertically oriented, each of said stands having a distal end with respect to said inside surface.

7. The assembly according to claim 4, wherein said reflector is oriented on said dome such that said second edge of said reflector is directed toward the ecliptic wherein said first surface is configured to be continuously exposed to sunlight as the sun travels along the ecliptic.

8. A solar powered boiler assembly being configured to produce steam from solar energy, said assembly comprising:
    a bowl being positioned in the ground, said bowl having an inside surface, an outside surface and a perimeter edge extending therebetween;
    a boiler being positioned in said bowl, said boiler having a fluid therein;
    a dome being removably positioned on said bowl;
    a plurality of lenses, each of said lenses extending through said dome such that each of said lenses is exposed to sunlight, each of said lenses focusing the sunlight onto said boiler to heat said boiler wherein said boiler is configured to produce steam by heating the fluid therein;
    a reflector being coupled to said dome, said reflector being comprised of a light reflecting material for reflecting sunlight onto said lenses;
    a pad being positioned below ground and being horizontally oriented, said pad having an upper surface, said pad being comprised of a rigid material;
    a plurality of supports, each of said supports being coupled to and extending upwardly from said upper surface of said pad, said outside surface of said bowl resting on each of said supports having said perimeter edge being aligned with a surface of the ground;
    wherein said inside surface of said bowl is comprised of a light reflecting material;
    wherein said inside surface of said bowl is concavely arcuate with respect to said perimeter edge such that said inside surface directs reflected light toward a focal point with respect to said bowl;

a plurality stands, each of said stands being coupled to and extending upwardly from said inside surface of said bowl having each of said stands being vertically oriented, each of said stands having a distal end with respect to said inside surface;

wherein said boiler is positioned on said distal end of each of said stands having said boiler being horizontally oriented in said bowl, said boiler being aligned with said focal point with respect to said bowl such that said inside surface of said bowl directs the reflected light onto said boiler;

wherein said boiler has an inlet and an outlet; and said boiler being comprised of a thermally conductive material.

9. The assembly according to claim 8, further comprising a fluid conduit being fluidly coupled to said inlet of said boiler, said fluid conduit being in fluid communication with a fluid source to direct a fluid into said boiler.

10. The assembly according to claim 8, further comprising:

an evacuation conduit being fluidly coupled to said outlet of said boiler;

an evacuation valve being fluidly coupled to said evacuation conduit, said evacuation valve being positionable in a closed position to inhibit air from passing through said evacuation conduit, said evacuation valve being positionable in an open position to facilitate air to pass through said evacuation conduit; and an evacuation pump being fluidly coupled to said evacuation conduit, said evacuation pump urging air outwardly from said boiler when said evacuation pump is turned on wherein said evacuation pump is configured to increase thermal communication between the fluid and said boiler.

11. The assembly according to claim 9, further comprising a fluid valve being coupled to said fluid conduit, said fluid valve being positionable in a closed position to inhibit the fluid from passing through said fluid conduit, said fluid valve being positionable in an open position to facilitate the fluid to pass through said fluid conduit.

12. A solar powered boiler assembly being configured to produce steam from solar energy, said assembly comprising:

a bowl being positioned in the ground, said bowl having an inside surface, an outside surface and a perimeter edge extending therebetween;

a boiler being positioned in said bowl, said boiler having a fluid therein;

a dome being removably positioned on said bowl;

a plurality of lenses, each of said lenses extending through said dome such that each of said lenses is exposed to sunlight, each of said lenses focusing the sunlight onto said boiler to heat said boiler wherein said boiler is configured to produce steam by heating the fluid therein;

a reflector being coupled to said dome, said reflector being comprised of a light reflecting material for reflecting sunlight onto said lenses;

a pad being positioned below ground and being horizontally oriented, said pad having an upper surface, said pad being comprised of a rigid material;

a plurality of supports, each of said supports being coupled to and extending upwardly from said upper surface of said pad, said outside surface of said bowl resting on each of said supports having said perimeter edge being aligned with a surface of the ground;

an air conduit being coupled to said bowl, said air conduit extending through said outside surface and said inside surface of said bowl;

an air pump being fluidly coupled to said air conduit, said air pump urging air outwardly from said bowl when said air pump is turned on; and an air valve being fluidly coupled to said air conduit, said air valve being positionable in an open position to facilitate air to flow through said air conduit, said air valve being positionable in a closed position to inhibit air from flowing through said air conduit.

13. The assembly according to claim 1, further comprising:

said inside surface being comprised of a light reflecting material, said inside surface being concavely arcuate with respect to said perimeter edge such that said inside surface directs reflected light toward a focal point with respect to said bowl;

a plurality of stands, each of said stands being coupled to and extending upwardly from said inside surface of said bowl having each of said stands being vertically oriented, each of said stands having a distal end with respect to said inside surface;

said boiler having an inlet and an outlet, said boiler being comprised of a thermally conductive material, said boiler being positioned on said distal end of each of said stands having said boiler being horizontally oriented in said bowl, said boiler being aligned with said focal point with respect to said bowl such that said inside surface of said bowl directs the reflected light onto said boiler;

a fluid conduit being fluidly coupled to said inlet of said boiler, said fluid conduit being in fluid communication with a fluid source to direct said fluid into said boiler;

a fluid valve being coupled to said fluid conduit, said fluid valve being positionable in a closed position to inhibit the fluid from passing through said fluid conduit, said fluid valve being positionable in an open position to facilitate the fluid to pass through said fluid conduit;

an evacuation conduit being fluidly coupled to said outlet of said boiler;

an evacuation valve being fluidly coupled to said evacuation conduit, said evacuation valve being positionable in a closed position to inhibit air from passing through said evacuation conduit, said evacuation valve being positionable in an open position to facilitate air to pass through said evacuation conduit;

an evacuation pump being fluidly coupled to said evacuation conduit, said evacuation pump urging air outwardly from said boiler when said evacuation pump is turned on wherein said evacuation pump is configured to increase thermal communication between the fluid and said boiler, said lenses being spaced apart from each other and being distributed around an entire curvature of said dome wherein said lenses are configured to continually focus sunlight onto said boiler as the sun travels along its ecliptic;

an air conduit being coupled to said bowl, said air conduit extending through said outside surface and said inside surface of said bowl;

an air pump being fluidly coupled to said air conduit, said air pump urging air outwardly from said bowl when said air pump is turned on;

an air valve being fluidly coupled to said air conduit, said air valve being positionable in an open position to facilitate air to flow through said air conduit, said air valve being positionable in a closed position to inhibit air from flowing through said air conduit;

said reflector having a first edge, a second edge and a first surface extending therebetween, said first surface being concavely arcuate between said first and second edges, said first edge lying on the ground, said first surface being spaced from and being co-arcuate with said outer surface of said dome, said reflector being oriented on said dome such that said second edge of said reflector is directed toward the ecliptic wherein said first surface is configured to be continuously exposed to sunlight as the sun travels along the ecliptic; and a cover being selectively positioned to cover said dome, said cover being comprised of an opaque material such that said cover inhibits sunlight from striking said lenses thereby inhibiting said boiler from being heated.

\* \* \* \* \*